Nov. 12, 1963 R. D. BREMER 3,110,795
DOMESTIC ELECTRIC APPLIANCE
Filed Sept. 17, 1959 2 Sheets-Sheet 1

INVENTOR.
Robert D. Bremer
BY Frederick M. Ritchie
His Attorney

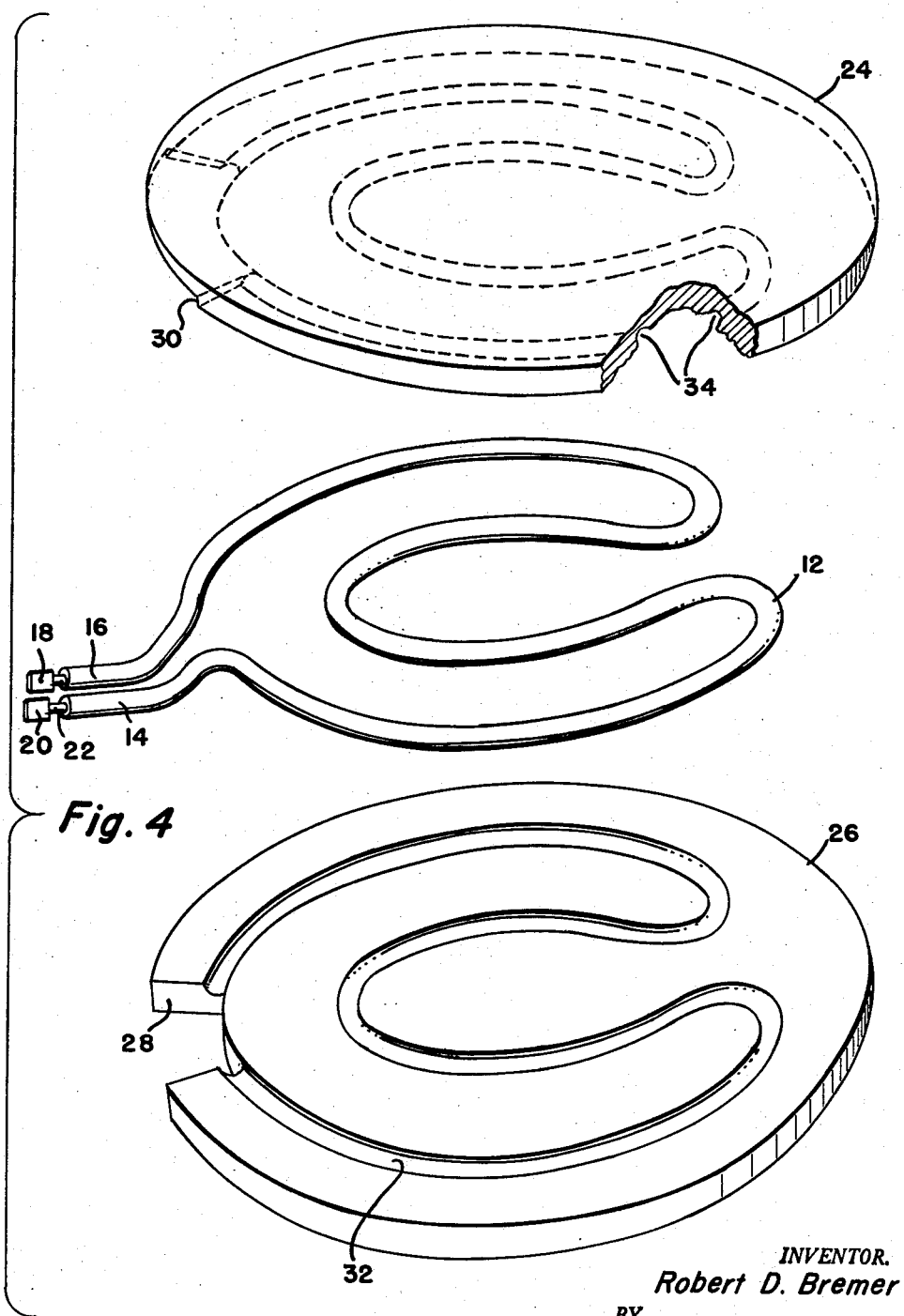

3,110,795
DOMESTIC ELECTRIC APPLIANCE

Robert D. Bremer, Dayton, Ohio, assignor to General Motors Corporation, Detroit, Mich., a corporation of Delaware
Filed Sept. 17, 1959, Ser. No. 840,715
1 Claim. (Cl. 219—37)

This invention relates to a domestic appliance and more particularly to an improved solid plate cooking unit.

The art of electric cooking has long sought a surface cooking unit which is durable, pleasing in appearance, easy to clean, and able to transmit heat quickly from the electrical resistance element to the cooking utensil or pan. The solid plate cooking unit has been recognized especially for its durability and for its ease of cleaning. However, the early attempts at developing a solid plate cooking unit were unsatisfactory in that the unit was slow to heat and, with its profuse use of ceramics, was anything but durable. In the past, it was necessary to embed an open resistance coil in a channel of powdered dielectric to protect the coil from the exposed plate. This dielectric packing eliminated the hazard of shock but it also slowed the speed with which the unit heated and tended to crack and dislodge with age. Thus, the electric cooking art turned from the earlier type solid plate heaters to the tubular sheathed spirally formed elements now in use. Although the spiral tubular elements provide rapid heat-up, they lack even heat distribution and the convolutions thereof are difficult to clean. This invention is directed to combining the best attributes of the spiral tubular element into an improved solid plate heater or cooking unit.

Accordingly, it is an object of this invention to provide a composite solid plate heater having a source of heat therefor sandwiched between cast top and bottom members.

Another object of this invention is the provision of a solid plate cooking unit having complementary top and bottom castings to retain a heating element therefor in sandwiched relationship.

A still further object of this invention is the provision of a solid plate cooking unit which may be reversible.

Further objects and advantages of the present invention will be apparent from the following description, reference being had to the accompanying drawings wherein preferred embodiments of the present invention are clearly shown.

In the drawings:

FIGURE 4 is an exploded view of the solid plate cooking unit of this invention with one portion being broken away to show a heating element retaining groove.

Figure 1:
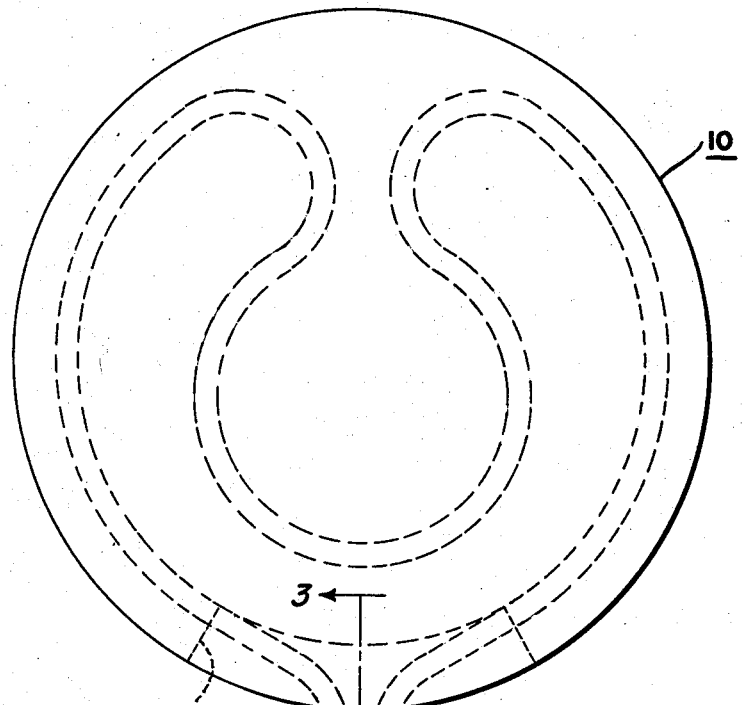
FIGURE 1 is a top elevational view of a solid plate cooking unit designed in accordance with the concepts of this invention.
Figure 3:
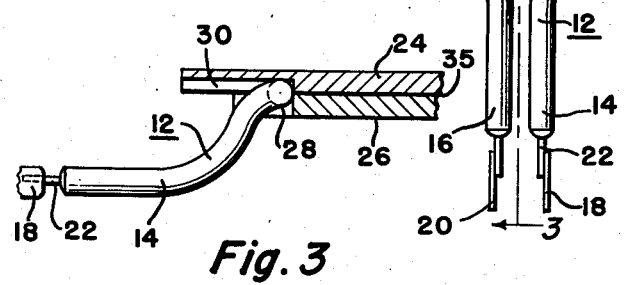
FIGURE 3 is a fragmentary side sectional view taken along line 3—3 in FIGURE 1 showing the disposition of the heating element terminal ends.

In accordance with this invention and with reference to FIGURE 1, a solid plate cooking unit or heater 10 is shown in top elevation. The cooking unit 10 has a generally circular configuration and is comprised of a top plate portion 24 and a bottom plate portion 26. The cooking unit 10 derives its source of heat from a tubular heating element 12 which is retained partially within the cooking unit in a sandwiched relationship. The heating element 12 has end portions 14 and 16 protruding from the cooking unit 10. The heating element 12 is also formed with a stainless steel tubular outer casing which serves as a housing for a resistance wire, the terminal ends 22 of which are exposed. A dielectric material such as magnesium oxide spaces the wire from the tubular casing. The terminal ends 22 of the resistance wire extend slightly from the end of the casing and have welded thereto spade or electrical connector members 18 and 20. The utilization of the cooking unit 10 is intended for electric range application at an approximate operating temperature of 1000° F., and the connecting spades 18 and 20 are adapted to be connected to any conventional terminal block (not shown) disposed adjacent the periphery of a range top opening for receiving the unit. The cooking unit 10 may be controlled in the same manner by which the present-day spirally formed tubular units are controlled. Namely, control may be effected through a temperature responsive arrangement whereby the power supply to the heating element 12 is proportioned in a given time interval in accordance with a user's temperature selection on an infinite heat switch.

Figure 2:
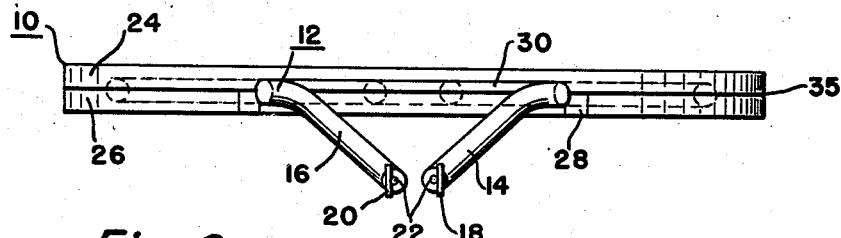
FIGURE 2 is a side elevational view of the solid plate cooking unit seen in FIGURE 1.

More particularly and with reference to FIGURES 2 and 4, the solid plate cooking unit 10 is shown comprised of an upper or top plate member 24 and a lower or bottom plate member 26. Disposed between the top and bottom members is the heating element 12. It will be noted that the bottom member 26 is formed or cast with a notch or open portion 28 at one point along its periphery to allow the terminal ends 14 and 16 of the heating element to project outwardly from between the solid plates 24 and 26. For a similar reason, the top plate 24 may be formed or cast with a notch or recess 30 to facilitate a straight generally radially outward projection of the heating element ends 14 and 16 as will be described hereinafter for a reversible unit 10. It should be recognized, however, that the notch 30 may be eliminated in the arrangement of the drawings where the end portions 14 and 16 of the heating element offset downwardly immediately.

For receiving the tubular heating element 12, the bottom plate 26 is cast with a groove 32 which is irregular in conformance with the shape of the bottom half of the heating element 12. Likewise, a groove 34 is cast into the upper plate member 24 for receiving the top half of the heating element 12. Note that the grooves 32 and 34 are shaped to confine and conform to the outer sheath of the heating element 12, allowing only for a bonding material 35 between adjacent members to intimately unite these members as will be described more fully hereinafter.

The method by which the improved solid plate heater may be manufactured will now be described. The method comprises a first step whereby two similar plates 24 and 26 are cast of a good grade of cast iron. In this way, a homogeneous casting results which is free of impurities. Of course, it is possible that other materials than iron, such as cast stainless steel, may provide the requirements of durability and rapid heat transfer essential to solid plate construction. But the wide range of operating temperatures for the unit 10 dictates that the plates 24 and 26 be formed of materials having the same coefficient of thermal expansion. In this way warpage of the cooking unit at high temperatures is eliminated. The casting procedure should form the grooves 32 and 34 as well as the notches 28 and 30 in these castings. It should be recognized that the casting process for the simple disc-like plates 24 and 26 is a simple problem since no heating element is joined with or embedded in the plate during the casting process. Further, the fact that the top and bottom castings 24 and 26 for the cooking unit 10 are unencumbered with attached or embedded elements permits the castings to be handled in any manner and treated to any process without the additional concern for the attached element. For instance, these castings could be handled roughly in large quantities and may be plated or surface-treated in any manner suitable to the single material forming the casting. Although the castings may be sized to any desired form suitable for use with an electric range, it has been found that a six or eight inch diameter plate such as 24 or 26 having a quarter inch thickness and defining therein grooves having a three sixty-fourths inch radius is suitable for use in the practice of this invention. The meandering configuration of the grooves 32 and 34 is such as to provide the most effective heat distribution of the heating element within the outer limits of the casting. Thus, for differently sized castings, the meandering or longitudinal configuration of the grooves may necessarily vary to provide the optimum transfer or conduction of heat to the casting from the heating element interposed between the castings and from the cooking unit to a utensil thereon.

The second step involves coating the entire surface of one of the plates including the groove therein with a high temperature stainless brazing compound (approximately 71% Ni, 16% Cr, 4% Si, 3¾% B and 4% Fe), such as Nicrobraze, which is sold by the Wall-Colmonoy Company of Detroit, Michigan. This brazing compound comes in a powdered form which may be sprinkled dry onto the surface of the plate and the grooves. It is also suitable for coating the surfaces to be bonded by being hot-sprayed or flame-sprayed to the desired thickness on the plate. During flame-spraying, the brazing powder becomes molten droplets which solidify upon hitting the plate prior to a subsequent brazing or fusing operation.

Assuming that the upper plate 24 is selected for the second step, the third step will encompass the laying or placement of heater 12 in the brazing compound coated groove 34 of the inverted upper plate 24. As aforesaid, the groove 34 closely lies in juxtaposition to the cylindrical or tubular shape of the element 12. Next, the exposed half of the heating element 12 is coated with the brazing compound to ensure that the heating element 12 will be completely bonded to the grooves 34 and 32 of both the top and bottom castings. Although the practice of this invention is believed to require a complete coating of brazing compound on the surfaces to be bonded, it is recognized that the brazing of the exposed surface of the heating element 12 after it is placed in the first groove 34 might not be necessary due to the sweating action or capillary attraction which will occur in the furnace during the brazing or fusing operation of the plates 24 and 26 to each other and to the interposed heating element 12.

At this point, it bears emphasizing that the improved configuration of the applicant's solid plate heater, improves markedly over the arrangement in the prior art whereby a tubular heating element is simply attached to a single solid plate or casting. In this prior art situation, it is necessary to flatten one side of the heating element 12 in order to secure enough contact surface for a satisfactory bond, i.e. a surface which is also sufficiently large to transfer the heat effectively from the heating element to the solid plate during cooking operations. However, in the improved cooking unit of this invention, the utilization of a round or cylindrical cooking tube places approximately fifty percent of the element in contact with each of the top and bottom plates. The element 12 is completely surrounded by the metal of the cooking unit 10. This metal rapidly dissipates the heat generated by the element 12. This characteristic permits the heating element to operate at cooler temperatures than the prior art devices where the tubular element is simply attached at one point, the remainder being exposed in the less heat conductive surrounding atmosphere. No flattening is necessary in the instant article and, thus, the entire manufacturing thereof is simplified in addition to the fact that a superior heat transfer results between the heating element and the solid plates.

After the upper plate 24 and the lower plate 26 are placed in sandwiched relationship to the heating element 12, and after the brazing compound has completely covered the surfaces to be bonded, the assembly is ready for a fusing operation. For this purpose, a controlled atmosphere furnace is most satisfactory for the brazing operation. More particularly, a dry hydrogen furnace operating at tempeartures between 1900° F. and 2150° F. may be used to receive the assembly. In the furnace a complete fusing will result wherein the heating element 12 is bonded completely to the grooves 32 and 34 and the plates 24 and 26 one to the other along their mating surfaces. It should be noted, however, that the novel configuration of the applicant's cooking unit assembly permits the use of a normal atmosphere furnace since the sandwiched relationship of the assembly necessarily excludes oxygen during brazing. It is imperative that oxidation be prevented if a complete and thorough bond is to occur between the components during the fusing process. A complete bond, it should be emphasized, between the plates and between the heating element and the plates is absolutely necessary in order to prevent the heating element from burning out during subsequent cooking operation.

Lastly, after the furnace brazing operation, the exterior surfaces of a completed cast iron assembly may be subjected to a protective coating such as a flame spray coating of aluminum or Nicrobraze. However, it is believed to enhance the simplicity of the manufacture if the plates 24 and 26 are plated after their casting or formation and prior to the bonding or fusing operation. In this way, the early failure of the unit is resisted since exposure of the heating element 12 to high temperatures is minimized and the contamination of heating element dielectric insulation prevented. This plating of the exterior surfaces of a cast iron plate is believed desirable for appearance and to prevent undue corrosion of the exposed surface of the cooking unit.

Within the purview of this invention, note also that the terminal ends 14 and 16 of the solid plate heater 10 may project directly radially outwardly rather than offsetting downwardly, the entire heating element 12 laying in a single plane. In such an arrangement, the cooking unit 10 is made reversible and adapted to be simply plugged into a receptacle at the side of the range opening. This permits the simple removal of the solid plate heater from the range and the transfer thereof to the sink for cleaning the unit. Then, too, as one surface of the heater 10 becomes worn, the unit can be reversed and the appearance life of the product doubled. Still further, a reversible application could encompass a top and bottom surface having different characteristics, such as a top surface plated in a light or bright color and a lower surface in a darker color.

It should now be seen that an improved cooking unit has been taught wherein a non-interrupted flat surface construction is utilized to provide even heat distribution. The spirally formed or sheathed tubular heating element of the prior art does not have such heat distribution in view of the point contact of the heating element convolutions with the cooking utensil. In the instant arrangement, the radiation downwardly is minimized, the contact with a pan or utensil on the top surface of the cooking unit serving at the easiest course for the heat conduction. The sandwiched relationship effects a durable cooking unit, smooth on both top and bottom surfaces and thereby easily cleaned. Since the unit 10 is formed of castings, the mass of the unit is considerable and this fact tends to minimize warpage of the unit during operation at relatively high temperatures. The fact that the castings or plate members are formed completely separate from the heating element 12 and prior to the fusing of the components enhances the life of the heating element 12 and further adds to the overall durability of this solid plate cooking unit.

While the embodiments of the invention as herein disclosed constitute preferred forms, it is to be understood that other forms might be adopted.

What is claimed is as follows:

A reversible cast iron solid plate cooking unit having flat, non-interrupted top and bottom appearance surfaces comprising, a circular disc-shaped top member having an irregular first groove in one side thereof, a circular disc-shaped bottom member co-extensive with and in juxtaposition to said top member, said top member engaging said bottom member along the peripheral edge thereof to form a joint facing generally radially outwardly, said bottom member having a second groove therein complementary to said first groove, a preformed cylindrical tubular heating element residing equally in said first and second grooves and having a cylindrical outer casing completely enclosed by said grooves, said tubular heating element having terminal portions extending generally radially outwardly from said cooking unit in the plane of said joint to facilitate the reversal thereof, and high temperature stainless brazing compound interposed between said members and said heating element for completely metallurgically bonding said members and the outer casing of said heating element together in a sandwiched relationship, said high temperature stainless brazing compound interposed between the peripheral edges of said members for sealing said joint around said cooking unit to prevent foreign matter from entering between said peripheral edges, thereby to facilitate the operation of said cooking unit irrespective of which appearance surface is being used.

References Cited in the file of this patent

UNITED STATES PATENTS

| | | |
|---|---|---|
| 1,460,259 | Lindermann | June 26, 1923 |
| 2,199,650 | Price | May 7, 1940 |
| 2,243,979 | Reynolds | June 3, 1941 |
| 2,470,715 | Olivares | May 17, 1949 |
| 2,656,593 | Heintz | Oct. 27, 1953 |
| 2,851,572 | Steck | Sept. 9, 1958 |

FOREIGN PATENTS

| | | |
|---|---|---|
| 973,034 | France | Feb. 6, 1951 |
| 899,982 | Germany | Dec. 17, 1953 |
| 904,672 | Germany | Feb. 22, 1954 |
| 964,080 | Germany | May 16, 1957 |